United States Patent
Brock

(10) Patent No.: US 6,609,416 B2
(45) Date of Patent: Aug. 26, 2003

(54) DIAGNOSTIC DEVICES FOR INTERNAL COMBUSTION ENGINES AND SYSTEMS FOR THEIR USE

(75) Inventor: John L. Brock, Auburn, MI (US)

(73) Assignee: SenX Technologies, LLC, Midland, MI (US)

( * ) Notice: Subject to any disclaimer, the term of this patent is extended or adjusted under 35 U.S.C. 154(b) by 0 days.

(21) Appl. No.: 10/052,168

(22) Filed: Jan. 16, 2002

(65) Prior Publication Data

US 2003/0131656 A1 Jul. 17, 2003

(51) Int. Cl.[7] .............................................. G01M 15/00
(52) U.S. Cl. ........................................................ 73/116
(58) Field of Search ........................ 73/115, 116, 117.3, 73/119 A, 35, 1 DV; 123/572, 574

(56) References Cited

U.S. PATENT DOCUMENTS 4,266,421 A * 5/1981 McDougal ................. 73/1 DV
4,292,841 A * 10/1981 Wesley ...................... 72/119 A
4,424,709 A    1/1984 Meier et al.
5,228,424 A *  7/1993 Collins ........................ 123/574

* cited by examiner

Primary Examiner—Eric S. McCall
Assistant Examiner—Monica D. Harrison
(74) Attorney, Agent, or Firm—McKellar Stevens; Robert L. McKellar

(57) ABSTRACT

Internal combustion diagnostic sensing devices, systems in which they are used, and methods for their use. The devices operate by detecting pulses created by the exhaust stream of internal combustion engines using a new and novel sensing device. The systems are comprised of a combination of the sensing devices and internal combustion diagnostic equipment. The devices and systems can be used for diagnostic operations on any internal combustion engine while the engine is operating.

7 Claims, 3 Drawing Sheets

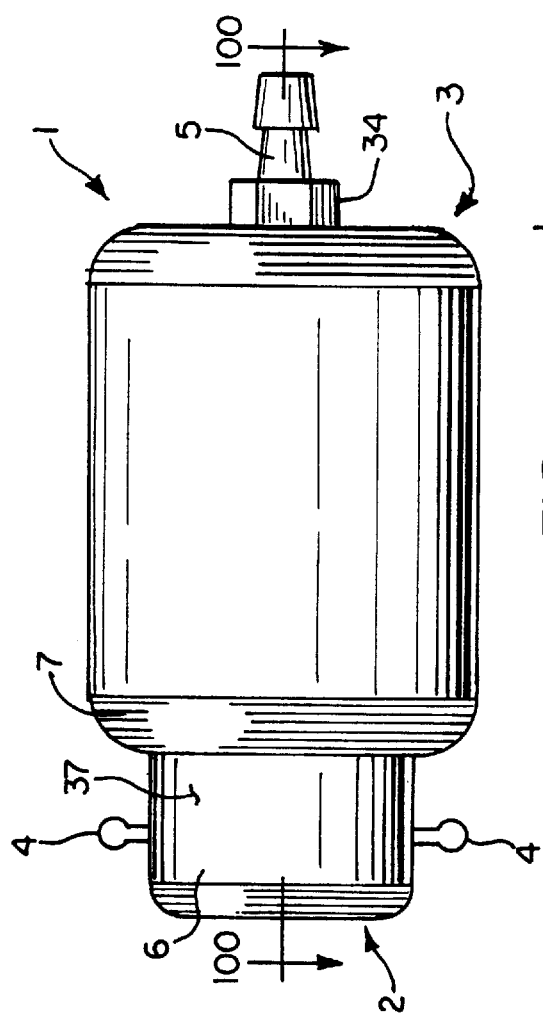
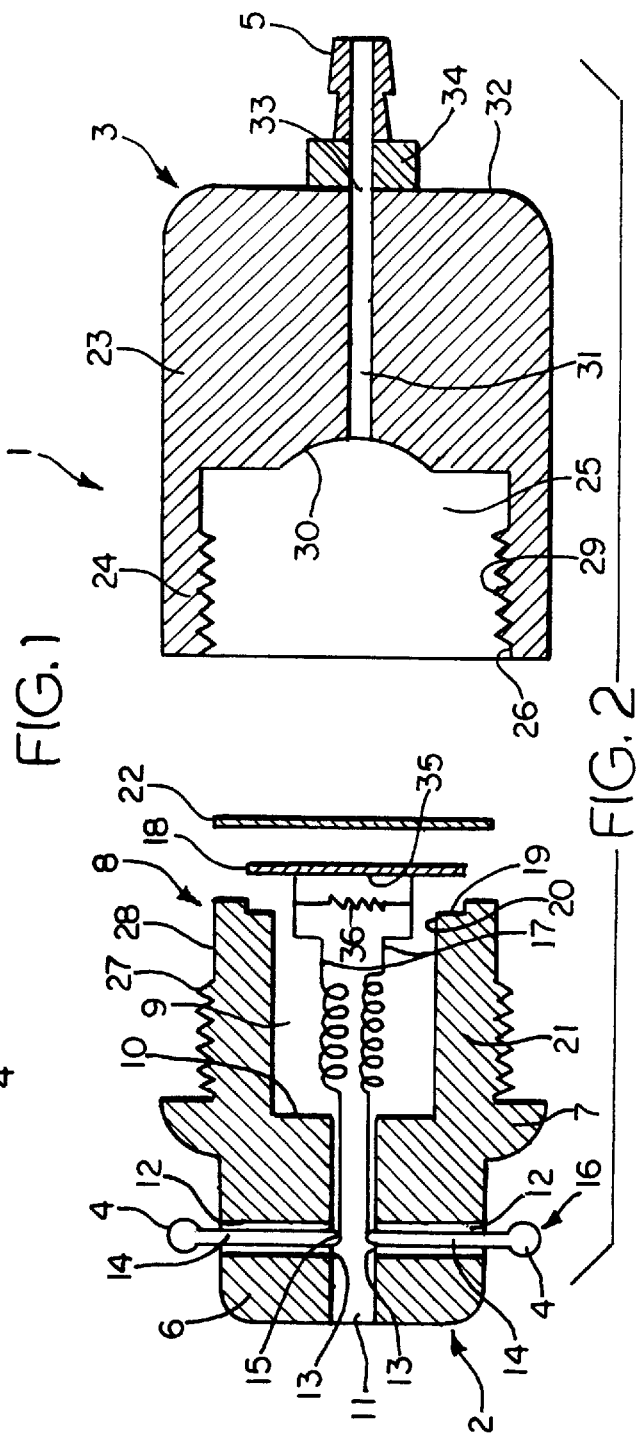

DIAGNOSTIC DEVICES FOR INTERNAL COMBUSTION ENGINES AND SYSTEMS FOR THEIR USE

The invention disclosed and claimed herein deals with diagnostic devices for internal combustion engines, systems in which they are used, and methods for their use. The devices of this invention operate by detecting pulses from the exhaust stream of internal combustion engines using a new and novel sensing device. The systems of this invention are comprised of a combination of the sensing devices and internal combustion engine diagnostic equipment, such as, for example, a Snap-on$^R$, Sun Machine, automotive engine analyzer. The devices and systems of this invention can be used for diagnostic operations on any internal combustion engine while the engine is operating.

BACKGROUND OF THE INVENTION

Since the inception of internal combustion engines there has been a need to be able to accurately diagnose disorders in such engines. Aside from the skilled and experienced mechanic, who can detect many engine disorders by listening to the performance of the engine, there have been many commercial systems developed to diagnose such engine disorders. The most modern of these systems are based on vacuum sensors and ignition sensors. Vacuum sensors are almost impossible to use due to the complex valves and electronics used in today's engines. Many of the engine problems require time-consuming removal of spark plugs and other routines before the actual diagnostic evaluation of the engine can begin. The most common of these problems are fuel injector problems and bad valves, and other ailments in and around cylinders of engines. The diagnosis of such disorders, even with today's most sophisticated equipment, can still take hours and create costly maintenance and repair for the automobile owner.

Mechanics too, would like to be able to increase the speed with which the diagnosis can be undertaken, and be able to get to the repair of the problem much more quickly.

In U.S. Pat. No. 4,424,709, that issued on Jan. 10, 1984 to Meier, Jr., et al. there is disclosed a frequency domain engine defect signal analysis system that includes sensors for detecting engine operating parameters such as engine speed, engine exhaust manifold pressure, engine intake manifold vacuum, blowby gas pressure in the engine crankcase, and oil pressure, from which an evaluation can be made of the engine operating conditions that is then compared to a normal engine operation. It should be noted that this system works in a frequency domain, while the sensors of the instant invention work in a time domain and that the sensors of the instant invention do not measure or monitor, but detect an event. It should also be noted that the sensors of the instant invention display raw data directly to an engine diagnostic scope, while the devices of the Meier, et al patent all utilize processes for the data before it is taken into the diagnostic mode.

The instant invention solves the problems enumerated above, and provides auto mechanics with a quick and easy means of diagnosis of internal combustion engine disorders without incurring high costs. The devices of this invention can be used by most mechanics because of the simplicity of use, the safety in using it, and the size of the device which can be held in the hand, and does not need a means to transport it.

The invention disclosed herein deals with an internal combustion engine diagnostic device comprising an insertable component having a housing that has a front and a back. The back has centered in it a closed hub that has a wall. The closed hub is integrally connected to and surmounted on an annular flange wherein the flange is integrally connected to and surmounted on an open hub. The open hub has a wall defining an interior void space, a front, an external surface, a shouldered seat in the wall at the open hub front thereof, and a bottom in the interior void space. The open hub has threads on the external surface and has an opening from the bottom of the void space and through a portion of the closed hub to form an elongated cavity on the interior of the closed hub. The closed hub has at least two second openings leading from the cavity through the closed hub wall and exiting to the outside of the closed hub, there being located in each such second opening, an electrical lead, each electrical lead having an external end and an internal end. The external end terminates upon exiting the closed hub through one of the second openings. The internal end passes into the elongated cavity and connects electrically to a wire lead wherein each wire lead passes through the elongated cavity, through the void space, and connects electrically to a piezoelectric diaphragm, which diaphragm is seated in the shouldered seat in the wall of the housing.

In addition, there is a noise reduction circuit. The noise reduction circuit is connected to and between each of the wire leads at or near the points of connection of the wire leads to the piezoelectric diaphragm. There is also a modulator disc, the modulator disc overlays the piezoelectric diaphragm and has a diameter equal to or greater than the diameter of the piezoelectric diaphragm.

There is a receiving component. The receiving component is comprised of a housing having a front, a back, and a sidewall defining an interior void space. The sidewall is threaded on the interior surface, and the interior void space has a bottom, which bottom has a saucer-like concave configuration, and, centered in the saucer-like concave configuration is an elongated opening. The elongated opening passes from the saucer-like concave configuration, through the receiving housing, and exits to the exterior of the receiving component and is terminated by a tube connection.

Another embodiment of this invention is an internal combustion engine diagnostic system that comprises in combination an internal combustion diagnostic device as described just above connected electrically to an engine diagnostic apparatus and, a tube that is connected to the tube connection of the internal combustion diagnostic device.

Yet another embodiment of this invention is a method of diagnosing internal combustion engine disorders. The method comprises connecting the opposite end of the tube not connected to the tube connection of the internal combustion engine diagnostic device, to the tailpipe, either directly or through some other connecting device of a vehicle, and securing the tube and then using the internal combustion engine diagnostic system as described just above while the engine of the vehicle is operating.

Going to still another embodiment of this invention, there is a vehicle, in which the vehicle has installed therein, a device of this invention, the device being electronically connected to any computer or other electronics located within the vehicle and with which the device is electronically compatible.

Still another embodiment of this invention is a device wherein the attachment of the insertable component to the receiving component is achieved by other means and thus, there is disclosed an internal combustion engine diagnostic device which comprises in combination an insertable component comprising a housing having a front and a back. The back has centered in it a closed hub having a wall. The closed hub is integrally connected to and surmounted on an annular flange. The flange is integrally connected to and surmounted on an open hub. The open hub has a wall defining an interior void space, a front, an external surface, a shouldered seat in the wall at the open hub front thereof, and a bottom in the interior void space. The open hub has an opening from the bottom of the void space and through a portion of the closed hub to form an elongated cavity on the interior of the closed hub. The closed hub has at least two second openings leading from the cavity through the closed hub wall and exiting to the outside of the closed hub. Located in each second opening is an electrical lead, each said electrical lead having an external end and an internal end, wherein each external end terminates upon exiting the closed hub through one of the second openings. The internal end passes into the elongated cavity and connects electrically to a wire lead and each wire lead passes through the elongated cavity, through the void space, and connects electrically to a piezoelectric diaphragm, which diaphragm is seated in the shouldered seat in the wall. There is a noise reduction circuit, the noise reduction circuit is connected to and between each of the wire leads at or near the points of connection of the wire leads to the piezoelectric diaphragm.

There is a modulator disc, the modulator disc overlays the piezoelectric diaphragm and has a diameter equal to or greater than the diameter of the piezoelectric diaphragm.

There is a receiving component, the receiving component comprises a housing having a front, a back, and a sidewall defining an interior void space. The interior void space has a bottom, which bottom has a saucer-like concave configuration, and, centered in the saucer-like concave configuration is an elongated opening, which elongated opening passes from the saucer-like concave configuration, through the receiving housing, and exits to the exterior of the receiving component and is terminated and capped by a tube connection.

Finally, another embodiment is a method of warning of an internal combustion engine disorder. The method comprises installing an internal combustion engine diagnostic device of this invention on or near the engine. The device is electronically connected to any computer or other electronics located within the vehicle and with which the device is electronically compatible. The computer or other electronics are capable of triggering a visible warning apparatus that is diagnosed when there is an engine disorder indicated by the internal combustion engine diagnostic device.

Turning now to the Figures, and with reference to FIG. 1, which is a full view of an internal combustion engine diagnostic device which is comprised of an insertable component comprising a housing having a front and a back. The back has centered therein a closed hub having a wall, the closed hub being integrally connected to and surmounted on an annular flange. The flange is integrally connected to and surmounted on an open hub, the open hub having a wall defining an interior void space, a front, an external surface, a shouldered seat in the wall at the open hub front thereof, and a bottom in the interior void space which has an opening from the bottom of the void space and through a portion of the closed hub to form an elongated cavity on the interior of the closed hub. The closed hub has at least two second openings leading from the cavity through the closed hub wall and exiting to the outside of the closed hub, there being located in each second opening, an electrical lead, wherein each electrical lead has an external end and an internal end, wherein each external end terminates upon exiting the closed hub through one of the second openings. The internal end passes into the elongated cavity and connects electrically to a wire lead, wherein each wire lead passes through the elongated cavity, through the void space, and connects electrically to a piezoelectric diaphragm, which diaphragm is seated in the shouldered seat in the wall. There is a noise reduction circuit, the noise reduction circuit is connected to and between each of the wire leads at or near the points of connection of the wire leads to the piezoelectric diaphragm. Surmounting the piezoelectric diaphragm is a modulator disc, the modulator disc unattachedly overlays the piezoelectric diaphragm and has a diameter equal to or greater than the diameter of the piezoelectric diaphragm.

There is a receiving component, the receiving component comprises a housing having a front, a back, a side wall defining an interior void space, the interior void space has a bottom, wherein the bottom has a saucer-like concave configuration, and, centered in the saucer-like concave configuration is an elongated opening. The elongated opening passes from the saucer-like concave configuration, through the receiving housing, and exits the exterior of the receiving component and is terminated by a tube connection.

BRIEF DESCRIPTION OF THE DRAWINGS

FIG. 1 is a device 1 of this invention showing a portion of the insertable component 2, and a full view of the receiving component 3, along with electrical leads 4 and the tube connector 5.

FIG. 2 is an fully exploded, cross-sectional view of a device of this invention showing a full cross-sectional view of the insertable component 2 and a full cross-sectional view of the receiving component 3.

DETAILED DESCRIPTION OF THE INVENTION

Figure 3:
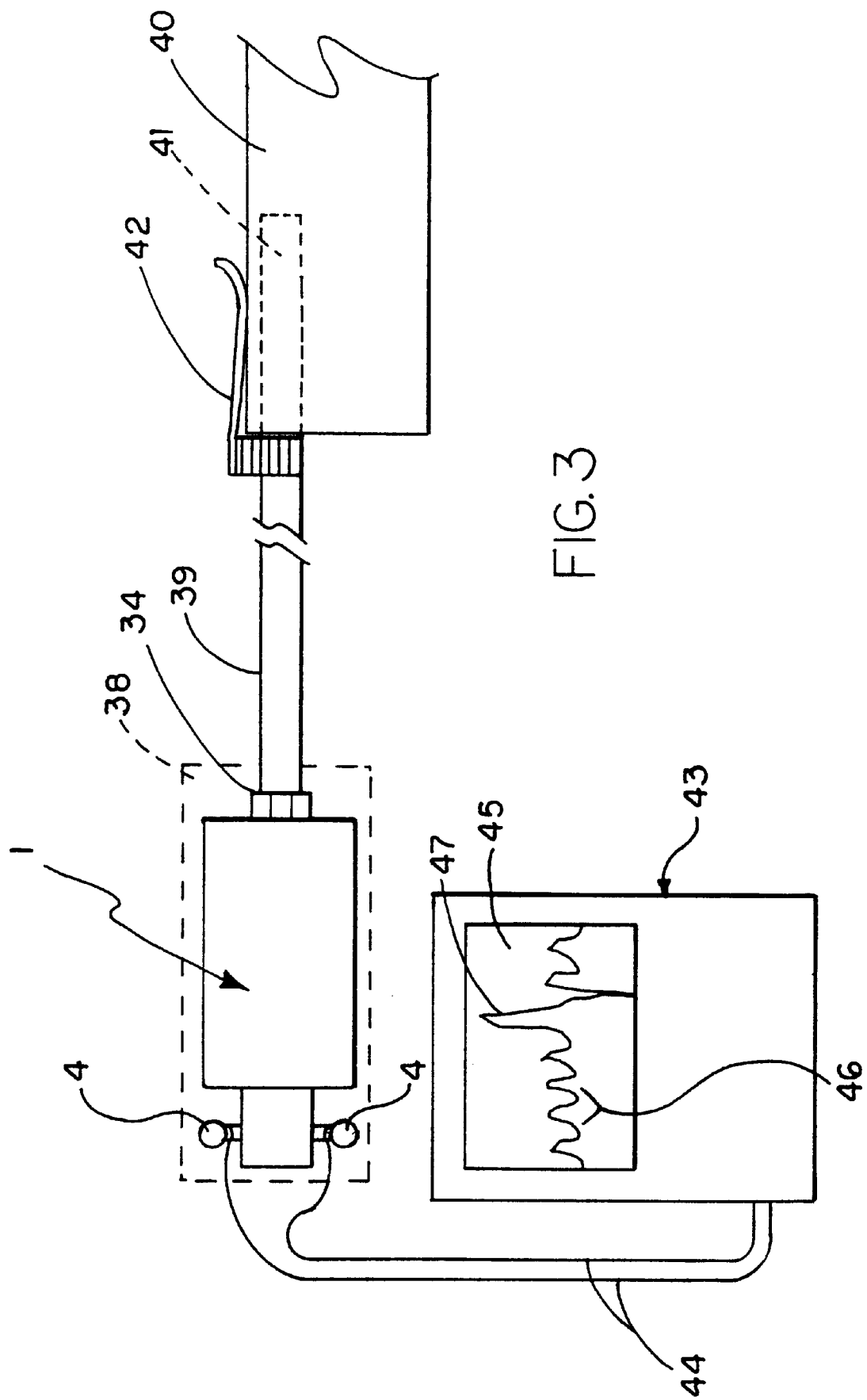
FIG. 3 is full schematic diagram of a system of this invention showing in combination a device of this invention, an internal combustion engine diagnostic apparatus, a portion of a tube connected to the tube connector of the device of this invention, and a portion of an exhaust pipe from a vehicle engine.

With reference to the Figures, and regarding FIG. 1, there is shown the device 1 of this invention further showing the insertable component 2, the receiving component 3, the closed hub 6, the tube connector 5, and optionally, the attaching means 34 for the tube connector 5 to the receiving component 3, and the leads 4.

Turning now to FIG. 2, wherein like numbers indicate like components as shown in FIG. 1, there is shown the insertable component 2, the receiving component 3, the closed hub 6, the flange 7, the open hub 8, it being noted that the components 6, 7, and 8 are integrally fitted together to form the housing 37. Situated on the external surface 28 of the open hub 8 are threads 27, which are compatible with the threads 29 located on the internal surface 26 of the void space 25 of the receiving component 3.

Located in the open hub 8 is a void space or open space 9, and the open space 9 has a bottom 10 in which there is shown an elongated cavity 11, and two secondary openings 12, which run from the base 13 of the elongated cavity 11 to the outside of the closed hub 8. Situated in the secondary openings 12, are electrical leads 14, each of which have an internal end 15 and an external end 16. The internal ends 15 are electrically connected to lead wires 17, which lead wires 17 pass though the elongated cavity 11 into the void space 9 and move through the void space 9 to electrically connect to a piezoelectric diaphragm 18. The piezoelectric diaphragm 18 is seated in a shouldered seat 19, which runs around the front inside edge 20 of the wall 21 of the insentable component 2.

Overlaying the piezoelectric diaphragm 18 is a modulator disc 22, wherein the diameter of the modulator disc 22 is equivalent to or greater than the diameter of the piezoelectric diaphragm 18. The modulator disc 22 can be but is not necessarily adhered to the piezoelectric diaphragm 18, but is compressed thereto by the receiving component 3 when the device is fully assembled.

Referring now to the receiving component 3, there is shown a housing 23, the wall 24 of which defines a second void space 25. The internal surface 26 of the wall 24 has threads 29 which are compatible with and receive the threads 27 of the insertable component 2. At the bottom of the void space 25 is a saucer-like concavity 30, the purpose of which will be discussed infra.

Leading from the bottom of the saucer-like concavity 30 is an elongated opening 31 that leads through the housing 23 to exit at the back 32 of the housing 23. The exit 33 is capped by a tube connector 5 that accommodates a tube (shown in FIG. 3).

In assembling the device 1, the lead wires 17 are electrically affixed to the bottom 35 of the piezoelectric diaphragm 18 while there is a noise reduction circuit 36 electrically attached between the lead wires 17 to form a sub-assembly. This sub-assembly is inserted into the void space 9 until the lead wires 17 reach into the elongated cavity 11 and touch the leads 4 secured in the secondary openings 12. The piezoelectric diaphragm 18 is then seated in the seat 19.

The modulator disc 22 is then laid over the piezoelectric diaphragm 18, and the receiving component 3 is then brought together with the insertable component 2 and the two components are set together tightly thereby compressing the modulator disc 22 in place and thereby completing the assembly.

The saucer-like concavity 30 is centered in the bottom of the void space 25. The saucer-like concavity 30 has a surface area at the top of the saucer-like concavity that is relative to the surface area of the top of the piezoelectric diaphragm 18, said surface area relationship having a ratio in the range of from zero to 1:1, the ratio actually used being dependent on the type of diaphragm 18 being used, the type of modulator disc 22 and its thickness, the use of adhesive backings or not, and the size of the diaphragm 18 being used. The saucer-like concavity 30 is essentially a gas expansion chamber, which essentially allows the diffusion of the incoming exhaust impulse across the top surface of the modulator disc 22. Thus, there is an importance to providing the proper surface area ratio between the area of the top of the saucer-like concavity 30 and the area of the top of the piezoelectric diaphragm 18, because if the pulse provided by the exhaust stream is not properly distributed, the characteristics of the diaphragm 18 output are diminished.

The modulator disc 22 is typically manufactured from chemical resistant materials, such as Teflon$^R$ or similar materials (Teflon is a registered trademark of the DuPont Chemical Co., Wilmington, Del., USA for products manufactured from polytetrafluoroethylene). Similar materials that are useful in this invention are polyethylene, polypropylene, or the like, depending on the environment that the diaphragm is being used in. The adhesive used on the modulator disc 22 is an adhesive tape. The type of adhesive is not critical and is usually an adhesive tape that does not diminish the activity of the modulator disc 22 by diminishing the pulse received from the exhaust stream. One such adhesive tape is Teflon tape of about 3 to 8 mil thickness, with an acrylic adhesive on the back. It should be noted that best results are achieved by making sure that the adhesive tape uniformly rests on and is bonded to the top surface of the diaphragm 18. As far as the inventor herein can ascertain, any adhesive tape will suffice for this application, as long as it will adhere to the diaphragm 18 surface and transmit impulses evenly across the piezoelectric diaphragm 18 surface.

The housings for the components of this invention are constructed from any solid material that has sufficient strength to support the internal components. Such materials should be selected on the basis of the end use application, that is, internal or external to an internal combustion engine diagnostic apparatus, or, for example, whether or not the device of this invention is installed in a vehicle, or not. Such materials useful in this invention are for, example, polyethylene, polypropylene, polyfluorinated polymers selected from polytetrafluoroethylene, fluorinated ethylene propylene, perfluoroalkoxys, polychlorotrifluoroethylene, ethylene tetrafluoroethylene and polyvinylidene fluoride polymers, silicone polymers, nylon, synthetic resins, metals selected from aluminum, copper, and alloys of aluminum and copper.

Figure 4:
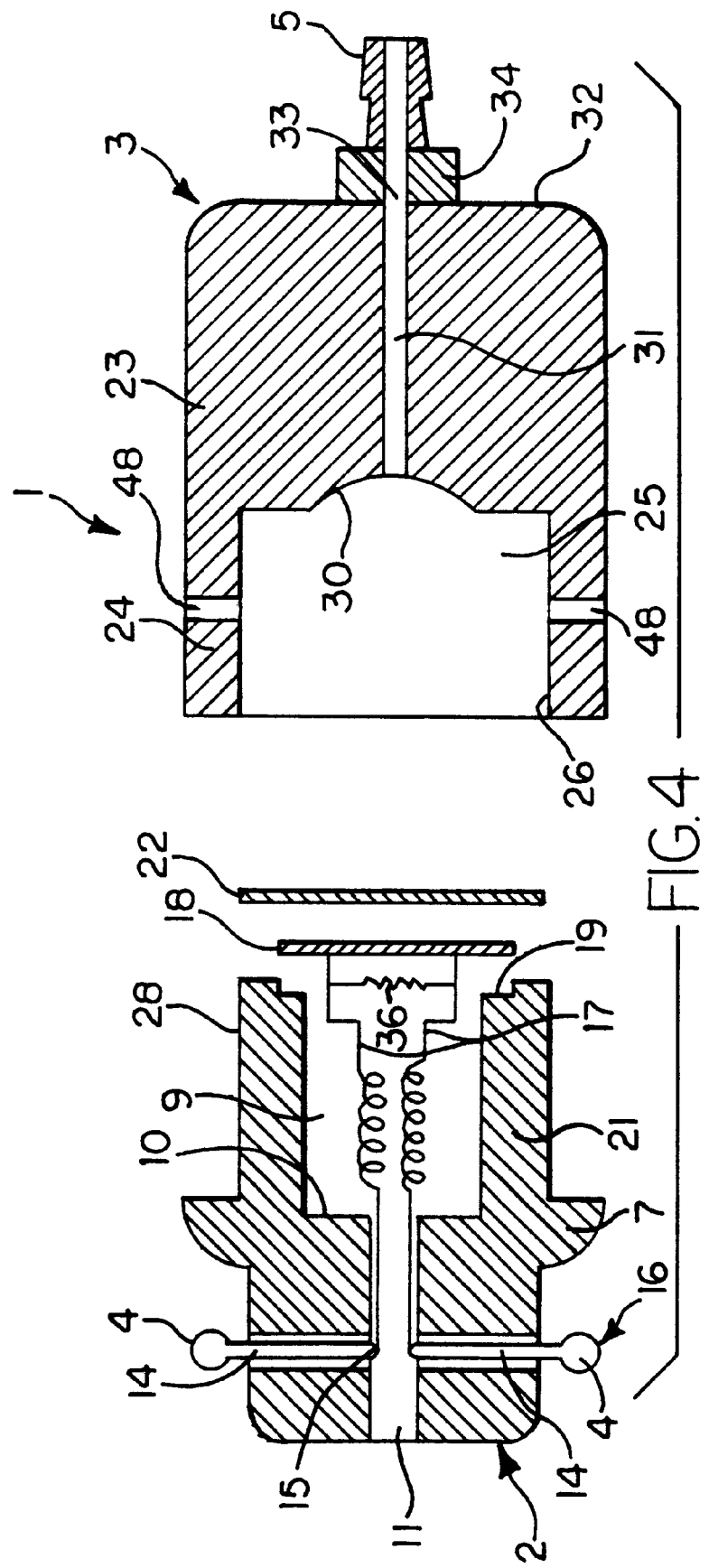
FIG. 4 is an fully exploded, cross-sectional view of the device of this invention showing a full cross-sectional view of the insertable component 2 and a full cross-sectional view of the receiving component 3, both without threaded surfaces.

A further embodiment of this invention can be observed from FIG. 4, that is a fully exploded cross-sectional view of the device of FIG. 1 through line 100—100 of FIG. 1, showing non-threaded components 2 and 3. Thus, it is contemplated within the scope of this invention to provide fastening means other than the threads described supra.

The fastening of the insertable component 2 and the receiving component 3 together can be achieved by any means in which the two components are securely coupled together during use, but that can be separable for examination, replacement, cleaning, or repair. For example, a tacky gel or adhesive can be applied to the external surface 28 of the insertable component 2 that would hold the two segments together, but would allow the two segments to be separated easily by hand, or the two components can be bolted, pinned, or screwed together by the use of the openings 48, shown on component 3 in FIG. 4. In this Figure, like numbers indicate like components as are shown in FIG. 2. The manner and means of fastening the two components is not critical as long as the two segments stay together during operation, and if desired, are separable by a simple means.

It is contemplated within the scope of this invention to house the device 1 in an additional housing 38, shown in phantom in FIG. 3, so that it may be easily handled, but moreover, the housing 38 would stabilize the assembly, and with regard to this, the housing 38 may be filled with vibration insulation or vibration dampening material (not shown), which would help prevent vibrations from the exhaust system of an internal combustion engine from interfering with the operation of the device 1.

In use, and with reference to FIG. 3, which is a schematic diagram of the apparatus 43 that is used in internal combustion diagnostic work, the device 1 is set up so that the tube connection 34 on the device 1 has attached to it, a tube 39 that is capable of withstanding the heat within an automotive exhaust pipe 40. The opposite end 41 of the tube 39 is inserted into the open end of the exhaust pipe 40 of the vehicle, and is secured in place such as with a clip 42, or the like. The tube 39 does not necessarily have to be directly tied to the exhaust pipe, it can be attached by some other means, such as inserted into an exhaust lead which carries the exhaust out of the vehicle and out into the atmosphere. The leads 4 are electrically connected to a commercial engine diagnostic apparatus 43 such that the apparatus 43 and the device 1 work in combination. As the exhaust system pumps exhaust out of the exhaust pipe 40, the pulses created by the engine, in the exhaust stream, are sensed by the device 1 as the impulses are pumped into the device 1 through the tube 39, into the void 25, where the impulses are dispersed across the modulator disc 22 by the gas expansion capabilities of the saucer-like concavity 30 which in turn relays the pulses to the piezoelectric diaphragm 18, which converts the pulses to electrical energy which energy is transmitted to the internal combustion engine diagnostic apparatus 43 through the leads 4 and electric wires 44 connected to the leads 4, which in turn are electrically connected to the internal combustion engine diagnostic apparatus 43. The results of the energy transmission are then illustrated on the scope 45 of the internal combustion engine diagnostic apparatus 43. As shown in FIG. 3, the normal pulses 46 can be contrasted to the abnormal pulse 47 that is indicative of the presence of a disorder in a portion of the internal combustion engine.

The noise reduction circuit 36 is one that is compatible with the internal combustion engine diagnostic apparatus 43 and the internal combustion engine diagnostic device 1 and is used to reduce electrical noise so that electrical patterns on the scope 45 of the internal combustion engine diagnostic apparatus 43 are clear and distinctive.

The advantage of the device 1 of this invention is that it makes the internal combustion engine diagnostic apparatus 43 more sensitive to changes in the internal combustion engine operation, and can be used directly with the apparatus 43 without the time consuming task of removing spark plugs or completing other routines, etc. to allow a diagnosis on the internal combustion engine. Moreover, it is a direct look at such engine operation since during normal operation of the engine, there is generated a string of pulses commensurate with the normal operation of the engine and when the engine experiences problems, this string of pulses shows distinctive changes. The device 1 of this invention detects these changes and allows them to be displayed on the scope 45 of the internal combustion engine diagnostic apparatus 43. When the system is timed to the number one spark plug firing, it is possible to trace problems to specific cylinders.

The devices 1 of this invention are safe to use, as they do not require electrical or mechanical power to operate, and output voltage levels from the piezoelectric diaphragm 18 are low.

Note that it is contemplated within the scope of this invention to build the devices of this invention directly into internal combustion engine diagnostic apparatii. It is further contemplated within the scope of this invention to build devices of this invention into automotive vehicles so that the automobile will have self-diagnostic capabilities, along with pre-warning capabilities so that the owner/operator of the vehicle will know immediately when here is a problem with the engine of the vehicle.

The methods and materials of construction, along with specifications are set forth in a concurrently pending U.S. patent application Ser. No. 09/870,189, filed May 30, 2001 in the name of the inventor herein, John L. Brock, and entitled NOVEL PIEZOELECTRIC TRANSDUCER ASSEMBLIES AND METHODS FOR THEIR USE, which is hereby incorporated by reference for what it teaches about piezoelectric transducer assemblies and their manufacture.

The piezoelectric diaphragms that are useful in this invention range in diameter from about 0.25 inches to about 2.5 inches, the preferred size being less than about 2 inches, and the most preferred being in the range of about ¾ of an inch to about 1 ⅛ inches. The preferred thickness of the diaphragms is in the range of about 0.008 millimeters to about 0.20 millimeters, and the most preferred ranges is about 0.01 to about 0.05 millimeters and especially preferred for this invention is a range of about 0.01 to about 0.03 millimeters. The diaphragms of this invention are commercially available, and are manufactured typically from stainless steel, ceramic, brass, and polymeric films the preferred diaphragms being stainless steel, and polymeric films, and especially preferred for overall performance is stainless steel.

Thin 2-layer diaphragms are the most versatile configuration of all. They may be used like single sheets (made up of 2 layers), they can be used to bend, or they can be used to extend. A 2-layer diaphragm produces curvature when one layer expands while the other layer contracts. These diaphragms are often referred to as benders, bimorphs, or flexural elements. Benders achieve large deflections relative to other piezo diaphragms.

What is claimed is:

1. An internal combustion engine diagnostic device comprising:
   a. an insertable component comprising a housing having a front and a back, said back having centered therein a closed hub having a wall, said closed hub being integrally connected to and surmounted on an annular flange; said flange being integrally connected to and surmounted on an open hub, said open hub having a wall defining an interior void space, a front, an external surface, a shouldered seat in the wall at the open hub front thereof, and a bottom in the interior void space, said open hub having threads on the external surface and having an opening from the bottom of the void space and through a portion of the closed hub to form an elongated cavity on the interior of the closed hub, said closed hub having at least two second openings leading from the cavity through the closed hub wall and exiting to the outside of the closed hub, there being located in each such second opening, an electrical lead, each said electrical lead having an external end and an internal end, wherein each external end terminates upon exiting the closed hub through one of the second openings, the internal end passing into the elongated cavity and connecting electrically to a wire lead, each wire lead passing through the elongated cavity, through the void space, and connecting electrically to:
   b. a piezoelectric diaphragm, which diaphragm is seated in the shouldered seat in the wall;
   c. a noise reduction circuit, said noise reduction circuit being connected to and between each of the wire leads at or near the points of connection of the wire leads to the piezoelectric diaphragm;
   d. a modulator disc, said modulator disc overlaying the piezoelectric diaphragm and having a diameter equal to or greater than the diameter of the piezoelectric diaphragm;
   e. a receiving component, said receiving component comprising a housing having a front, a back, a side wall defining an interior void space, said side wall threaded on the interior surface, said interior void space having a bottom, which bottom has a saucer-like concave configuration, and, centered in the saucer-like concave configuration, an elongated opening, which elongated opening passes from the saucer-like concave configuration, through the receiving housing, and exiting to the exterior of the receiving component and being terminated by a tube connector.

2. An internal combustion engine diagnostic system, comprising in combination:
   (I) an internal combustion diagnostic device as claimed in claim 1 connected electrically to:
   (II) an internal combustion engine diagnostic apparatus and,
   (III) a tube capable of withstanding high temperatures, connected to the tube connection of the internal combustion diagnostic device.

3. The internal combustion engine diagnostic system as claimed in claim 2, wherein the internal combustion engine diagnostic device is housed in a housing.

4. A method of diagnosing internal combustion engine disorders, the method comprising:
   A. inserting the opposite end of the tube not connected to the tube connection of the internal combustion engine diagnostic device into the tailpipe of a vehicle and securing the tube therein;
   B. using the internal combustion engine diagnostic system as claimed in claim 2 while the internal combustion engine is operating.

5. A vehicle, said vehicle having installed therein, a device of claim 1, said device being electronically connected to any computer or other electronics located within the vehicle and which are electronically compatible therewith.

6. A method of warning of an internal combustion engine disorder, said method comprising:
   (I) installing on or near an internal combustion engine an internal combustion engine diagnostic device of claim 1, said device being electronically connected to a computer or other electronics and electronically compatible therewith;
   (II) providing a visible warning apparatus that is triggered by the computer or other electronics when there is an engine disorder indicated by the internal combustion engine diagnostic device.

7. An internal combustion engine diagnostic device comprising:
   (i) an insertable component comprising a housing having a front and a back, said back having centered therein a closed hub having a wall, said closed hub being integrally connected to and surmounted on an annular flange; said flange being integrally connected to and surmounted on an open hub, said open hub having a wall defining an interior void space, a front, an external surface, a shouldered seat in the wall at the open hub front thereof, and a bottom in the interior void space and having an opening from the bottom of the void space and through a portion of the closed hub to form an elongated cavity on the interior of the closed hub, said closed hub having at least two second openings leading from the cavity through the closed hub wall and exiting to the outside of the closed hub, there being located in each such second opening, an electrical lead, each said electrical lead having an external end and an internal end, wherein each external end terminates upon exiting the closed hub through one of the second openings, the internal end passing into the elongated cavity and connecting electrically to a wire lead, each wire lead passing through the elongated cavity, through the void space, and connecting electrically to: a piezoelectric diaphragm, which diaphragm is seated in the shouldered seat in the wall;
   (ii) a noise reduction circuit, said noise reduction circuit being connected to and between each of the wire leads at or near the points of connection of the wire leads to the piezoelectric diaphragm;
   (iii) a modulator disc, said modulator disc overlaying the piezoelectric diaphragm and having a diameter equal to or greater than the diameter of the piezoelectric diaphragm; a receiving component, said receiving component comprising a housing having a front, a back, a side wall defining an interior void space, said interior void space having a bottom, which bottom has a saucer-like concave configuration, and, centered in the saucer-like concave configuration, an elongated opening, which elongated opening passes from the saucer-like concave configuration, through the receiving housing, and exiting to the exterior of the receiving component and being terminated by a tube connection.

* * * * *